United States Patent
Ashley et al.

(10) Patent No.: US 10,356,052 B1
(45) Date of Patent: Jul. 16, 2019

(54) APPARATUS AND METHOD FOR ADMINISTERING PROXY IDENTITIES

(71) Applicant: Anonyome Labs, Inc., Draper, UT (US)

(72) Inventors: Paul Ashley, Toowong (AU); Steve Shillingford, Draper, UT (US); John David Mumford, Portola Valley, CA (US); Simon Gee, Varsity Lakes (AU); Greg Clark, San Francisco, CA (US)

(73) Assignee: Anonyome Labs, Inc., Draper, UT (US)

( * ) Notice: Subject to any disclaimer, the term of this patent is extended or adjusted under 35 U.S.C. 154(b) by 141 days.

(21) Appl. No.: 15/705,738

(22) Filed: Sep. 15, 2017

Related U.S. Application Data

(60) Provisional application No. 62/527,960, filed on Jun. 30, 2017.

(51) Int. Cl.
| | | |
|---|---|---|
| *H04L 29/06* | (2006.01) | |
| *H04L 29/08* | (2006.01) | |
| *G06F 21/62* | (2013.01) | |

(52) U.S. Cl.
CPC ...... *H04L 63/0421* (2013.01); *G06F 21/6254* (2013.01); *H04L 63/0281* (2013.01); *H04L 63/0407* (2013.01); *H04L 63/0884* (2013.01); *H04L 67/2804* (2013.01); *H04L 67/2819* (2013.01); *H04L 67/2838* (2013.01)

(58) Field of Classification Search
CPC .............. G06F 21/6254; H04L 63/0407; H04L 63/0421
See application file for complete search history.

(56) References Cited

U.S. PATENT DOCUMENTS

| | | | | |
|---|---|---|---|---|
| 9,514,459 | B1* | 12/2016 | Doshi .................. | G06Q 20/383 |
| 2004/0034542 | A1* | 2/2004 | Watson ................. | G06Q 40/04 |
| | | | | 705/1.1 |
| 2006/0005020 | A1* | 1/2006 | Hardt .................... | H04L 63/105 |
| | | | | 713/166 |
| 2010/0281059 | A1* | 11/2010 | Lynch .................... | G06Q 30/02 |
| | | | | 707/784 |
| 2013/0298187 | A1* | 11/2013 | Black ..................... | G06F 21/00 |
| | | | | 726/1 |
| 2014/0108371 | A1* | 4/2014 | Swerdlow ............. | G06F 3/0482 |
| | | | | 707/706 |

(Continued)

OTHER PUBLICATIONS

Chen, "A Scenario for Identity Management in Daidalos", 8 pages (Year: 2007).*

*Primary Examiner* — Thaddeus J Plecha
(74) *Attorney, Agent, or Firm* — Cooley LLP

(57) ABSTRACT

A non-transitory computer readable storage medium has instructions executed by a processor to host a proxy identity depot service application program interface to provide communication channels for proxy identity enabled applications operative on client devices. A proxy identity depot has a proxy identity management service, a proxy identity reputation service and a proxy identity transfer service. The proxy identity depot includes proxy identities for a real user, where each proxy identity has its own identity attributes to protect primary identity attributes of the real user and thereby each proxy identity is operative as a personal privacy proxy.

5 Claims, 10 Drawing Sheets

(56) References Cited

U.S. PATENT DOCUMENTS

| | | | |
|---|---|---|---|
| 2015/0026049 A1* | 1/2015 | Theurer | G06Q 20/36 |
| | | | 705/41 |
| 2015/0358331 A1* | 12/2015 | Rachalwar | H04L 63/105 |
| | | | 726/7 |
| 2017/0228791 A1* | 8/2017 | Min | G06Q 30/0271 |
| 2017/0325141 A1* | 11/2017 | Laliberte | H04W 12/06 |
| 2017/0331812 A1* | 11/2017 | Lander | H04L 63/0815 |
| 2018/0232538 A1* | 8/2018 | Chiang | H04L 67/22 |
| 2018/0295135 A1* | 10/2018 | Feijoo | H04L 63/10 |

* cited by examiner

Name: Hank Rearden
Reputation Score: 8.1
Role: Selling personal items
Location: Gold Coast, Australia
Creation Date: 1st Jan 2017
Phone Numbers: +61 456 678 567
Call History: Log of calls
Message History: Log of messages
Email Address: hrearden@personamail.com
Email History: Log of emails
Contacts: Address book
Avatar: Graphical image
Persona Handle: hr234_persona
Payment Artifacts: Card 1, Card 2
Transaction History: Log of purchases, refunds
Billing Address: 256 Salt Lake Avenue, Surfers Paradise
Delivery Address: P.O.Box 1032, Southport
Browser: History, Favorites, Password cache
Activity Name: eBay
Activity u/p: hr_persona, 5678abdc!ty

FIG. 3

1. Name
2. Reputation Score
3. Role
4. Location
5. Creation Date
6. Phone Numbers
    a. Call History
    b. Voicemail
    c. SMS/MMS History
7. Email Address
    a. Email History
    b. S/MIME Certificates
8. Contacts
9. Avatar
10. Payments
    a. Payment Artifacts
    b. Transaction History
    c. Billing Address
    d. Shipping Address
11. Browser
    a. History
    b. Bookmarks/Favorites
    c. Username/password cache
12. Activities
    a. Activity Name
    b. Username/password
    c. Parameters

FIG. 4

User account creation and management
Proxy Identity provisioning
Device registration and management
Phone number provisioning
Out-of-network voice calling
Out-of-network SMS/MMS
In-network handle creation
In-network encrypted voice calling
In-network encrypted video calling
In-network encrypted messaging
Email account provisioning
Out-of-network email
In-network encrypted email
S/MIME certificate issuance & management
Out-of-network S/MIME encrypted email
Contact management
Payment provisioning
Payment transactions
Marketplace management
Reputation management
In-app purchases
In-app accounting
Avatar creation
Compartmentalized browser management
Shipping address management
Activity management

FIG. 8

APPARATUS AND METHOD FOR ADMINISTERING PROXY IDENTITIES

CROSS-REFERENCE TO RELATED APPLICATION

This application claims priority to U.S. Provisional Patent Application Ser. No. 62/527,960, filed Jun. 30, 2017, the contents of which are incorporated herein by reference.

FIELD OF THE INVENTION

This invention relates generally to communications in computer networks. More particularly, this invention relates to administering proxy identities in computer networks.

BACKGROUND OF THE INVENTION

With the current state of identity theft, uncontrolled data collection and unsolicited targeted marketing, there is a need for a user to protect a primary identity and to compartmentalize digital activities. For example, the user might prefer to use a primary identity for general browsing or reading online newspapers, separated from accessing and commenting on social media, separated from dating, separated from purchasing from e-commerce services, and separated from selling furniture in a digital marketplace.

One method to achieve this separation (or compartmentalization) is to allow a user to create multiple proxy identities and then use them for different purposes. Each proxy identity has its own identity attributes which may include name, creation date, phone number, email address, payment method, browser and shipping address. Each proxy identity can be used for a limited and specific purpose, so that tracking of that identity would not form a complete picture of the user's activity. The proxy identities act as a personal privacy proxy, not allowing various Internet services and people access to the user's primary identity. The proxy identity may also be referred to as a synthetic identity.

Identity proxies can be used for a wide variety of activities including dating, shopping, selling, social media, and work. Each proxy identity is fitted with capabilities to allow one to act fully on behalf of the user: emailing, calling, messaging, browsing, shipping and payments. Some proxy identities will live for a short time and some proxy identities will live indefinitely. Identity proxies may accrue real monetary value over time: these proxy identities may have a strong reputation, following of users, and may be socially influential to consumers.

Users should be able to transfer their proxy identities to other users. When a proxy identity is passed from one user to another, it is important that the complete proxy identity history is also transferred. This could include, for example, name, reputation score, location, creation date, phone numbers, call history, voicemails, message history, email address, email history, contacts, avatar, browsing history and account configurations.

To enable a proxy identity to come to life in this way there is a need for techniques for administering proxy identities. More particularly, there is a need for a proxy identity depot where a proxy identity can be created, where it can be ascribed attributes, where it builds reputation, and where it can be traded among users. Ideally, proxy identity enabled applications can be built to leverage the services of the depot itself.

SUMMARY OF THE INVENTION

A non-transitory computer readable storage medium has instructions executed by a processor to host a proxy identity depot service application program interface to provide communication channels for proxy identity enabled applications operative on client devices. A proxy identity depot has a proxy identity management service, a proxy identity reputation service and a proxy identity transfer service. The proxy identity depot includes proxy identities for a real user, where each proxy identity has its own identity attributes to protect primary identity attributes of the real user and thereby each proxy identity is operative as a personal privacy proxy.

BRIEF DESCRIPTION OF THE FIGURES

The invention is more fully appreciated in connection with the following detailed description taken in conjunction with the accompanying drawings, in which:

FIG. 3 illustrates proxy identity information utilized in accordance with an embodiment of the invention.

FIG. 4 illustrates a proxy identity packet utilized in accordance with an embodiment of the invention.

FIG. 8 illustrates proxy identity depot service API function categories utilized in accordance with an embodiment of the invention.

Like reference numerals refer to corresponding parts throughout the several views of the drawings.

DETAILED DESCRIPTION OF THE INVENTION

Figure 1:
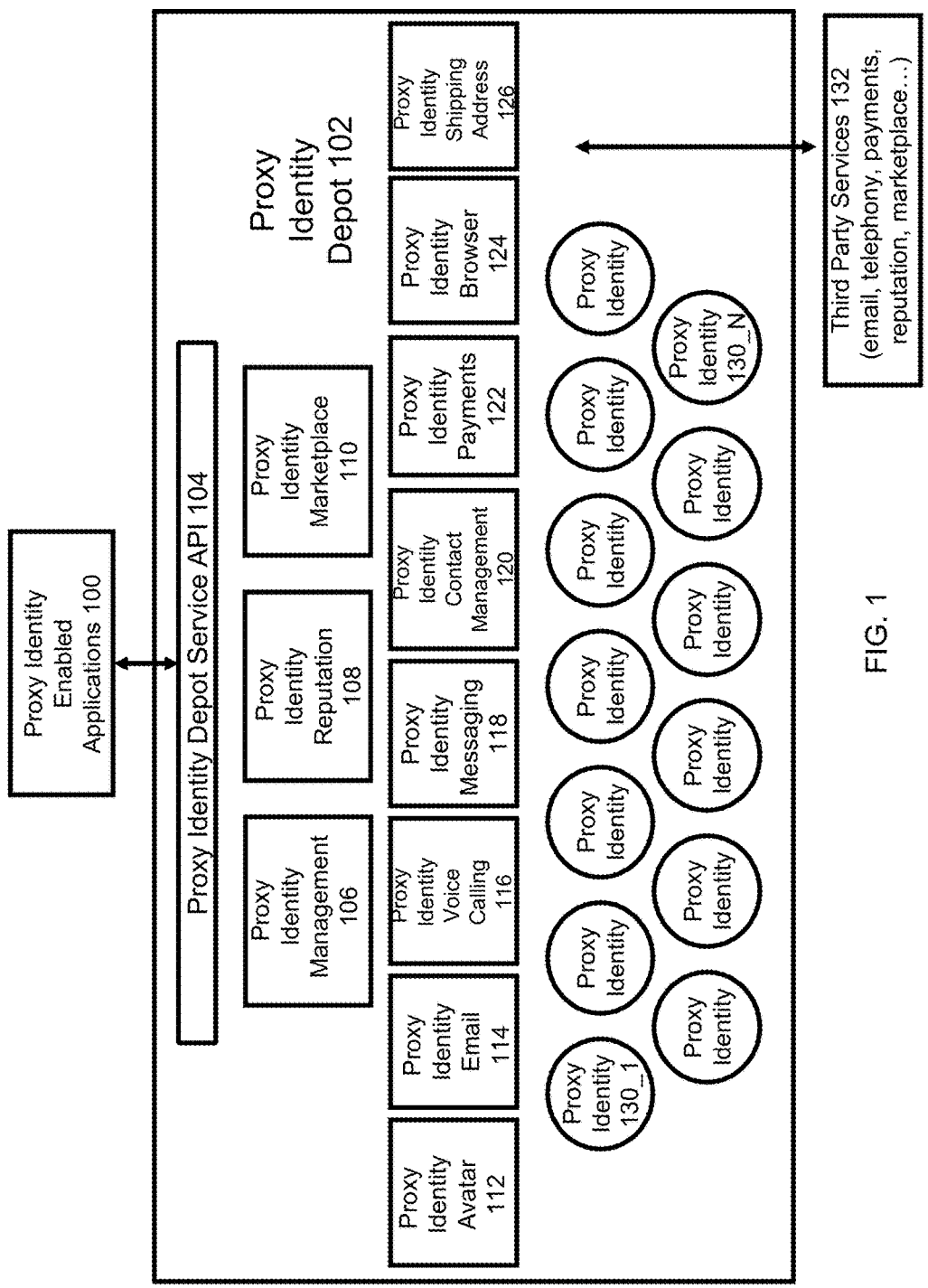
FIG. 1 illustrates a system configured in accordance with an embodiment of the invention.

FIG. 1 illustrates Proxy Identity Enabled Applications (e.g., mobile, web, desktop) 100 built to leverage the services of a Proxy Identity Depot 102. These applications communicate with the depot through a well-defined Proxy Identity Depot Service API 104.

The depot 102 includes core proxy identity related services. These services include Proxy Identity Management 106 for creating, registering, fitting out and deleting a proxy identity. The Proxy Identity Reputation scoring service 108 allows a quantifiable reputation figure to be calculated based on the activities of the proxy identity. The Proxy Identity Marketplace 110 provides services for buying, selling, trading and auctioning of proxy identities.

A variety of services bring a proxy identity to life. Such services include avatar creation 112, email 114, voice calling 116, messaging 118, contact management 120, payments 122, browsing 124 and shipping 126. Each of these services may be delivered directly by the Proxy Identity Depot, or more likely some of the services may leverage third party services. Additional services may be supplied by the Proxy Identity Depot 102.

The Proxy Identity Depot 102 stores information about the proxy identities 130_1 through 130_N. In one embodiment, the information includes name, location, creation date, and also contains history of the activities, e.g., communications and browsing history of the proxy identity. Some of these will be unencrypted (out of logistical necessity), however, some of these could be managed as encrypted data stores by the Proxy Identity Depot 102.

Also shown in the figure is interaction with third party services 132. In some instances the Proxy Identity Depot will implement a service, e.g., internal email service, and in other instances it may leverage services outside of the depot, e.g., third party reputation service.

FIG. 1 illustrates three core services. Proxy Identity Management 106 allows for the creation, registration, fitting out, and deletion of a proxy identity. It is the main interface for setting up a proxy identity ready for activity. Proxy Identity Reputation 108 tracks a reputation score. It allows third parties to understand the relative merits of the proxy identity. It can also interface with a third party Proxy Identity Reputation service. Proxy Identity Marketplace 110 allows a user to transfer a proxy identity to another user. The Proxy Identity Marketplace 110 allows for proxy identities to be bought/sold/traded/auctioned. It can also interface with a third party Proxy Identity Marketplace service.

A user that owns a proxy identity is able to activate and use that proxy identity. That is, the user is able to take the proxy identity into the situation where they don't want to expose all of their primary identity e.g. dating, shopping, selling, and socializing.

Figure 2:
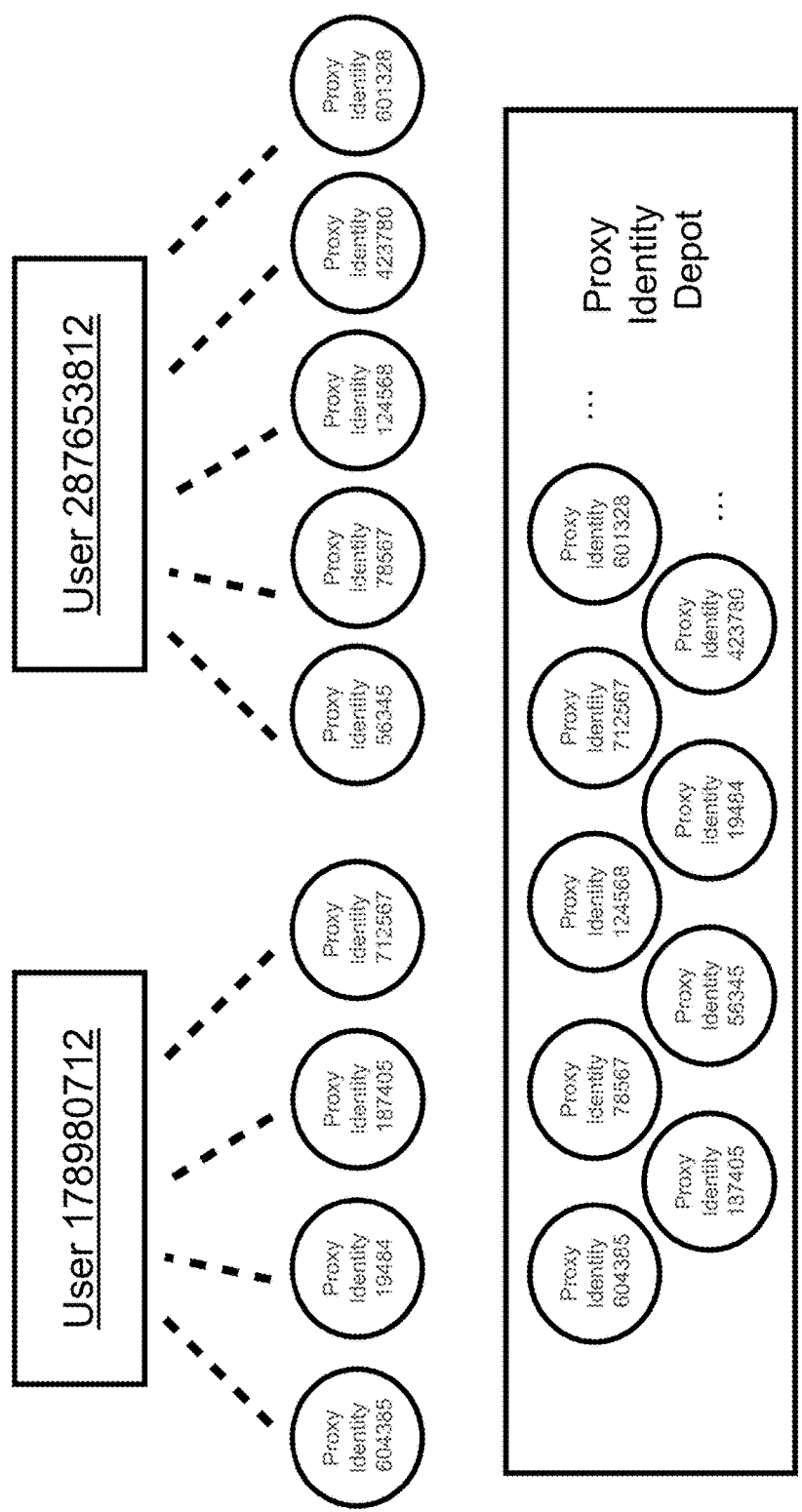
FIG. 2 illustrates user owned proxy identities managed in accordance with embodiments of the invention.

In FIG. 2, User 178980712 owns four proxy identities 604385, 19484, 187405 and 712567. The numbers are user IDs and proxy identity IDs to illustrate the need to programmatically identify them. This user is able to communicate as those proxy identities, browse as those proxy identities, shop as those proxy identities and so on. User 287653812 owns five different proxy identities 78567, 124568, 56345, 601328, and 423780. This user is also able to use their proxy identities to protect their primary identity.

An important concept is that a proxy identity is not just a collection of identity characteristics. It is a complete encapsulation of identity characteristics and the activity history of that proxy identity. We call this a Proxy Identity Packet. FIG. 3 shows an example Proxy Identity Packet. This concept is further illustrated in FIG. 4 where the Proxy Identity Packet encapsulates all of the identity attributes and history of activity.

Returning to FIG. 1, the Proxy Identity Management service 106 allows a user to manage their proxy identities through the full lifecycle. In one embodiment, this includes:

Creation: Requesting the Proxy Identity Depot 102 to create a new proxy identity.

Registration: Registering the creation of the proxy identity with the Proxy Identity Reputation service 108.

Fitting out: Provisioning (as required) avatar, email address, phone number, address book, payment artifacts, compartmentalized browser and shipping address.

Updating: Adding to or updating proxy identity fit outs.

Deletion: Requesting the Proxy Identity Depot to delete the proxy identity.

A Proxy Identity Management Application (e.g., 100) calls into the Proxy Identity Depot Service API 104 to leverage the services of the Proxy Identity Management service 106. It in turns leverages the provisioning services for avatar 112, email 114, phone number 116, contacts 120, payments 122, browser 124 and shipping address 126. In addition, the Proxy Identity Management service 106 registers the proxy identity with the Proxy Identity Reputation service 108.

In a similar way that credit agencies calculate and maintain an on-going credit score for an individual's credit, the Proxy Identity Reputation service 108 calculates an on-going reputation score for a proxy identity. This reputation score increases if the user is active with their proxy identity in a variety of activities. One example is if the user is buying or selling with their proxy identity and there are continuous successfully authorized activities. This increases the proxy identity's relative reputation score.

As different proxy identity services are invoked, the Proxy Identity Reputation service 108 updates the proxy identity's reputation score accordingly. U.S. Pat. No. 9,703,986, which is owned by the assignee of the current patent application, defines a system and method to calculate on-going proxy identity reputation. It also uses a block chain as an immutable store of the reputation calculation. U.S. Pat. No. 9,703,986 is incorporated herein by reference.

Figure 5:
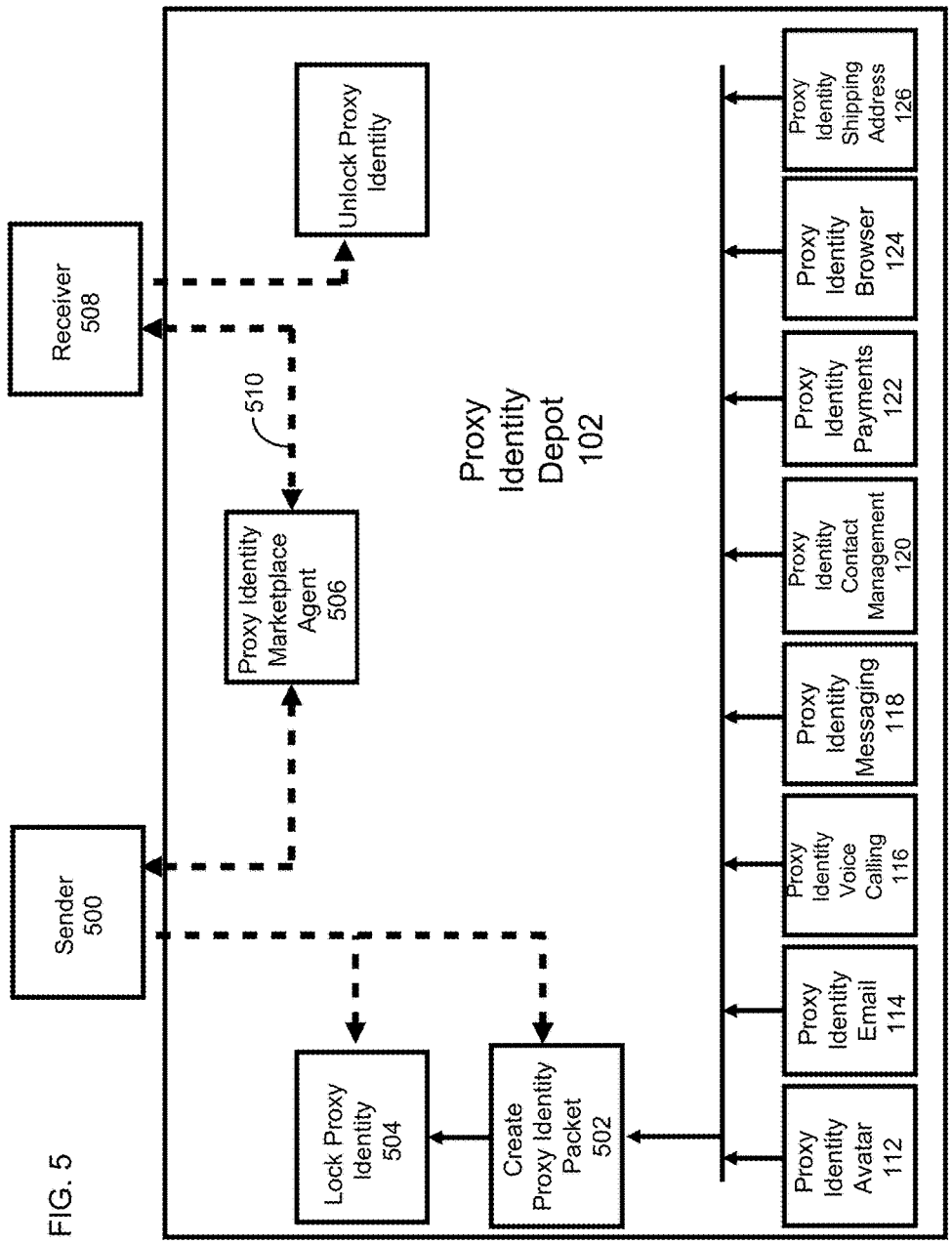
FIG. 5 illustrates a proxy identity transfer performed in accordance with an embodiment of the invention.

When a user wants to transfer a proxy identity to another user, the user places the proxy identity into the Proxy Identity Marketplace 110. As shown in FIG. 5, there are a number of steps in transferring a proxy identity:

1. The Sender 500 who wants to transfer a proxy identity must first collate all of the proxy identity information together. This steps involves creation of the Proxy Identity Packet 502 that includes all of the information as outlined in FIG. 4.

2. The Sender 500 notifies the Proxy Identity Depot 102 that the proxy identity should be "locked" i.e. that it is no longer active 504. This means that the Sender can no longer interact with that proxy identity.

3. The Proxy Identity Marketplace Agent 506 brokers a transfer deal between the Sender 500 and Receiver 508.

A. Sender 500 and Receiver 508 establish a secure channel 510 relayed through the Agent 506 (standard crypto processes apply, but are omitted for brevity).

B. Receiver 508 creates a temporary public/private key pair.

C. Receiver 508 sends the public key to the Sender 500.

D. Sender 500 encrypts the requisite info for transmission using the receiver's temporary public key.

E. Receiver 508 decrypts the information purchased from the Sender 500.

F. Details (e.g., account assignments) that are managed by the Agent 506 are re-set from the sender's account to the receiver's account.

4. The Receiver notifies the Proxy Identity Depot 102 that the proxy identity should be "unlocked", i.e., that it is now active. This means that the Receiver 508 can interact with that proxy identity.

Figure 6:
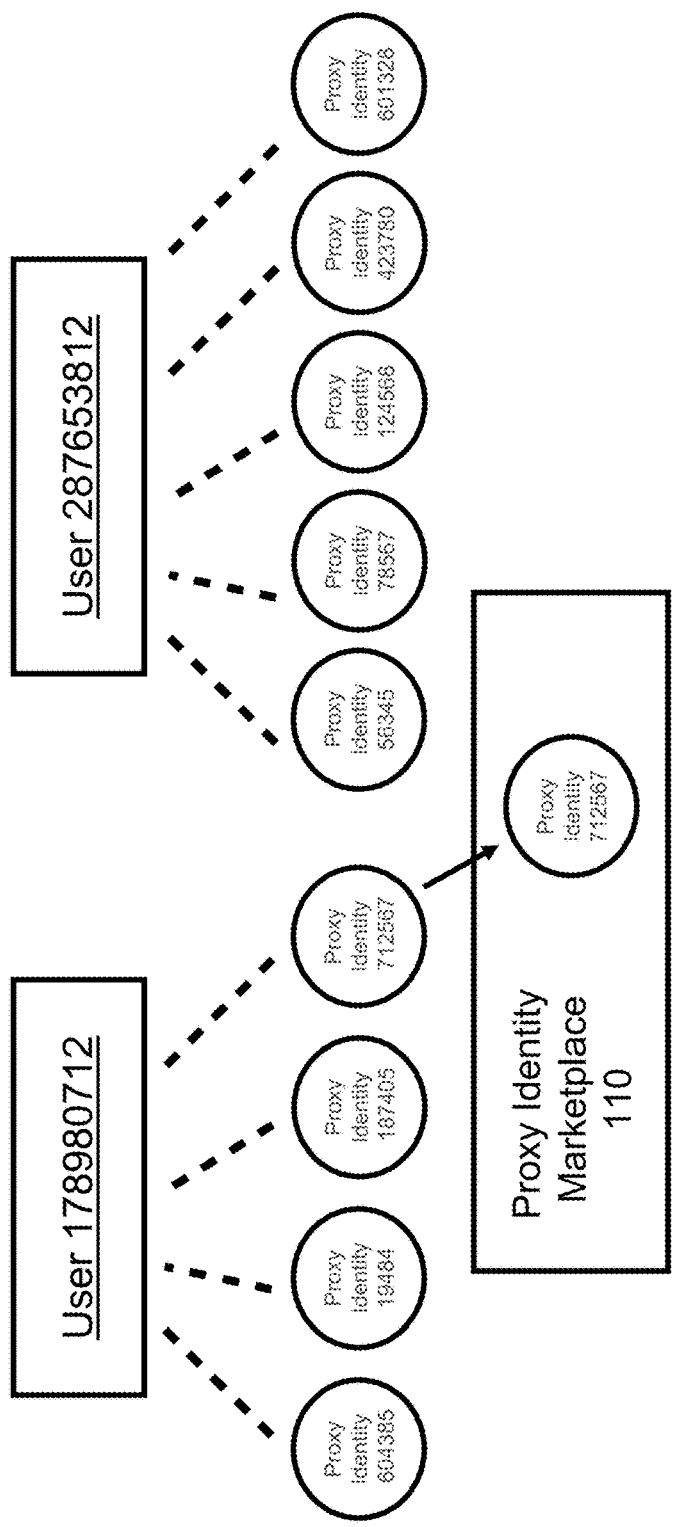
FIG. 6 illustrates a proxy identity transfer within a single marketplace in accordance with an embodiment of the invention.

An example scenario is demonstrated in FIG. 6. User 178980712 has decided to sell Proxy Identity 712567 to User 287653812. To enable this to happen, User 178980712 places Proxy Identity 712567 into the Proxy Identity Marketplace 110. A transaction takes place to enable User 287653812 to take ownership of the proxy identity. To enable the transfer of a Proxy Identity there are a number of key services provided by the Proxy Identity Marketplace 110:

List Proxy Identity for Sale: Indicate in the Proxy Identity Marketplace that a specific proxy identity is to be sold. This could include sale to a specific user, a specific price and so on.

Purchase Proxy Identity: Indicate to the Proxy Identity Marketplace the desire to purchase the proxy identity.

Initiate Trade of Proxy Identity: Indicate to the Proxy Identity Marketplace that a proxy identity owned by the first user is to be traded with a specific proxy identity from another user.

Accept Trade of Proxy Identity: Indicate to the Proxy Identity Marketplace that a proposed trade is accepted.

List Proxy Identity for Auction: Indicate to the Proxy Identity Marketplace that a proxy identity is to be auctioned.

Bid on Proxy Identity at Auction: Indicate to the Proxy Identity Marketplace a bid for a proxy identity listed for auction.

Figure 7:
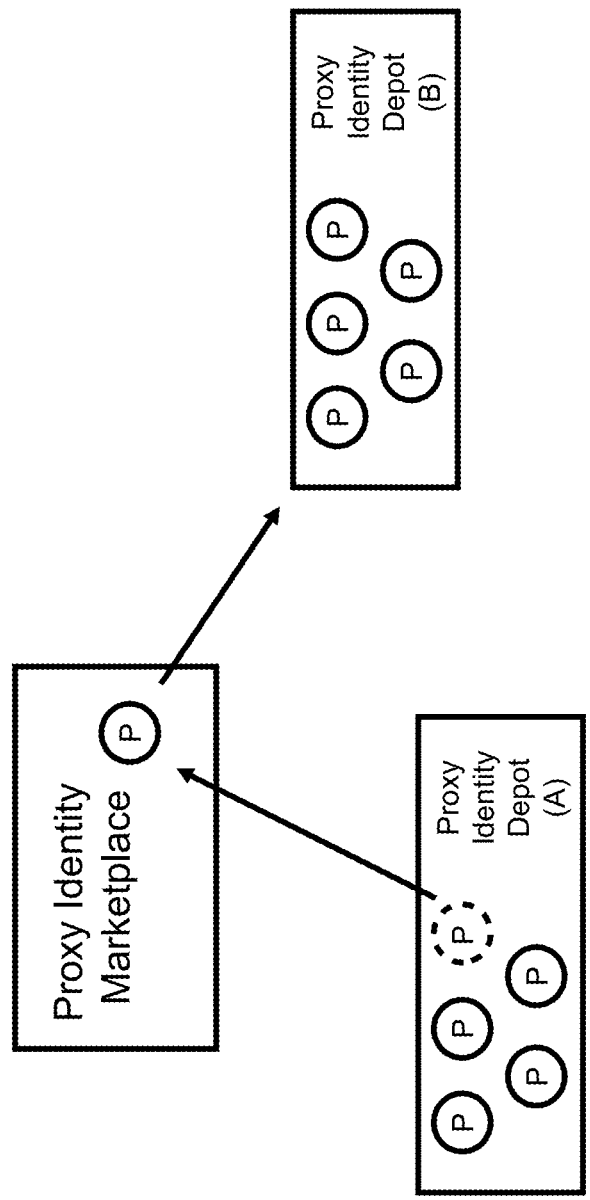
FIG. 7 illustrates a proxy identity transfer between marketplaces in accordance with an embodiment of the invention.

The expectation is that there may be many Proxy Identity Depots. They could exist in different locations and operate completely independently. There is the same need to transfer proxy identities from one Proxy Identity Depot to another. In this case again a Proxy Identity Marketplace can provide that capability. This is shown in FIG. 7.

Having a set of proxy identity services available is only useful if applications can be built to leverage those services. The Proxy Identity Depot Service API 104 is defined to allow applications to be built to leverage the services. FIG. 8 shows some of the key functional category areas of the API.

Figure 9:
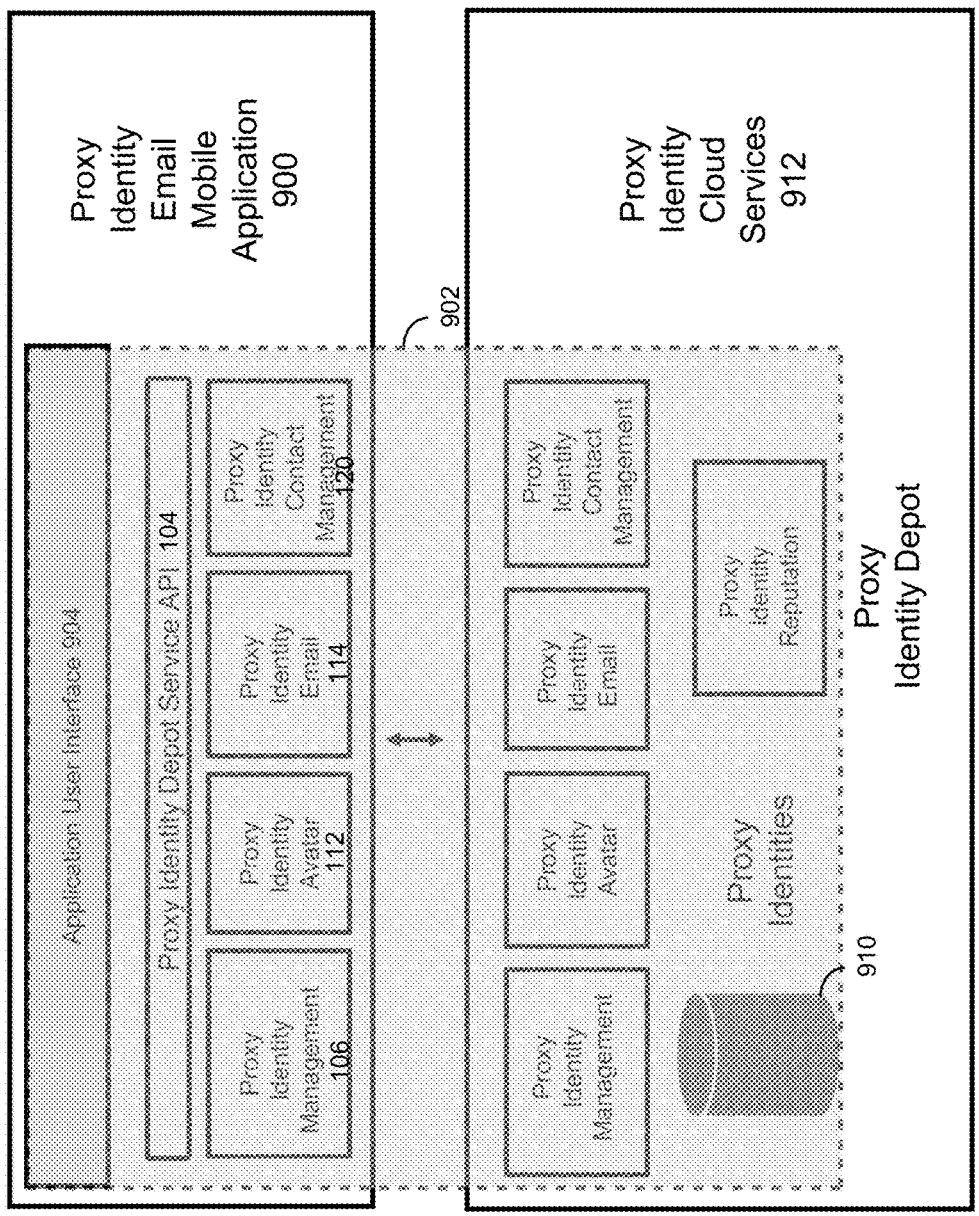
FIG. 9 illustrates a proxy identity email application leveraging proxy identity depot services supplied in accordance with an embodiment of the invention.

FIG. 9 demonstrates how a Proxy Identity Email Mobile Application 900 is constructed from the Proxy Identity Depot 102. Included within the dotted box 902 there are both client and backend cloud services components of the Proxy Identity Depot. The application developer builds an Application User Interface 904 that begins by calling into the Proxy Identity Depot Service API 104 for Identity Management (proxy identity creation and registration) 106, avatar creation 112, email account creation 114 and contact address book creation 120. The Application User Interface then enables the user to send and receive emails as that proxy identity and create and delete new contacts for that email account. In the Proxy Identity Depot all of the proxy identity email related events are registered to the Proxy Identity Reputation service 108. Also shown is the storage of proxy identities 910 by cloud service 912.

Figure 10:
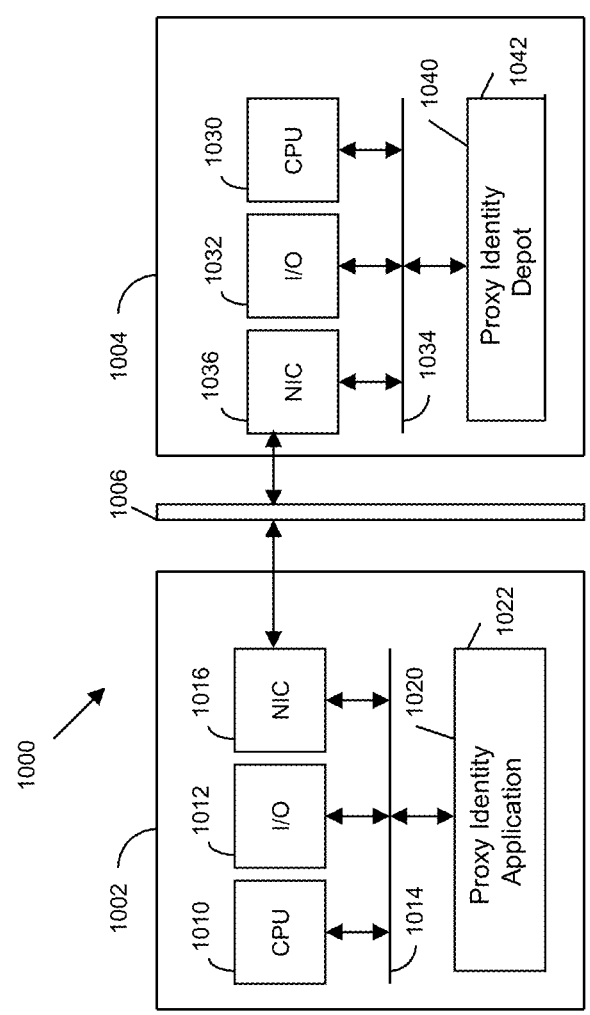
FIG. 10 illustrates a system configured in accordance with an embodiment of the invention.

FIG. 10 illustrates a system 1000 configured in accordance with an embodiment of the invention. The system 1000 includes a client device 1002 connected to a server 1004 via a network 1006, which may be any combination of wired and wireless networks. Client device 1002 may be a personal computer, tablet, mobile device and the like. The client device includes a central processing unit 1010 connected to input/output devices 1012 via a bus 1014. The input/output devices 1012 may include a keyboard, mouse, touch display and the like. A network interface circuit (NIC) 1016 provides connectivity to network 1006. A memory 1020 is connected to the bus 1014. The memory stores instructions executed by the central processing unit 1010. In particular, the memory 1020 stores a proxy identity application 1022 of the type discussed herein.

Server 1004 includes a central processing unit 1030, input/output devices 1032, a bus 1034 and a network interface circuit 1036. A memory 1040 is connected to bus 1034. The memory 1040 stores a proxy identity depot 1042 with the characteristics disclosed herein.

An embodiment of the present invention relates to a computer storage product with a computer readable storage medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs, DVDs and holographic devices; magneto-optical media; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using JAVA®, C++, or other object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A non-transitory computer readable storage medium with instructions executed by a processor to:
   host a proxy identity depot service application program interface to provide communication channels for proxy identity enabled applications operative on client devices; and
   support a proxy identity depot with a proxy identity management service, a proxy identity reputation service and a proxy identity transfer service, wherein the proxy identity depot includes a plurality of proxy identities for a real user, wherein each proxy identity has its own identity attributes to protect primary identity attributes of the real user and thereby each proxy identity is operative as a personal privacy proxy;
   wherein the proxy identity transfer service locks a proxy identity associated with the real user, brokers an exchange of the proxy identity from the real user to a new user, and unlocks the proxy identity associated with the new user.

2. The non-transitory computer readable storage medium of claim 1 wherein the proxy identity depot service application program interface exposes operations performed by the proxy identity management service, the proxy identity reputation service and the proxy identity transfer service.

3. The non-transitory computer readable storage medium of claim 1 wherein each proxy identity has its own identity attributes including a name, a reputation score, an email address, a phone number, and a delivery address.

4. The non-transitory computer readable storage medium of claim 1 wherein each proxy identity has its own identity attributes including a role, creation date, call history, message history, email history, address book, avatar, transaction history and browser information.

5. The non-transitory computer readable storage medium of claim 1 wherein the proxy identity transfer service transfers a proxy identity associated with the real user from the proxy identity depot to a new proxy identity depot.

\* \* \* \* \*